Patented Feb. 13, 1923.

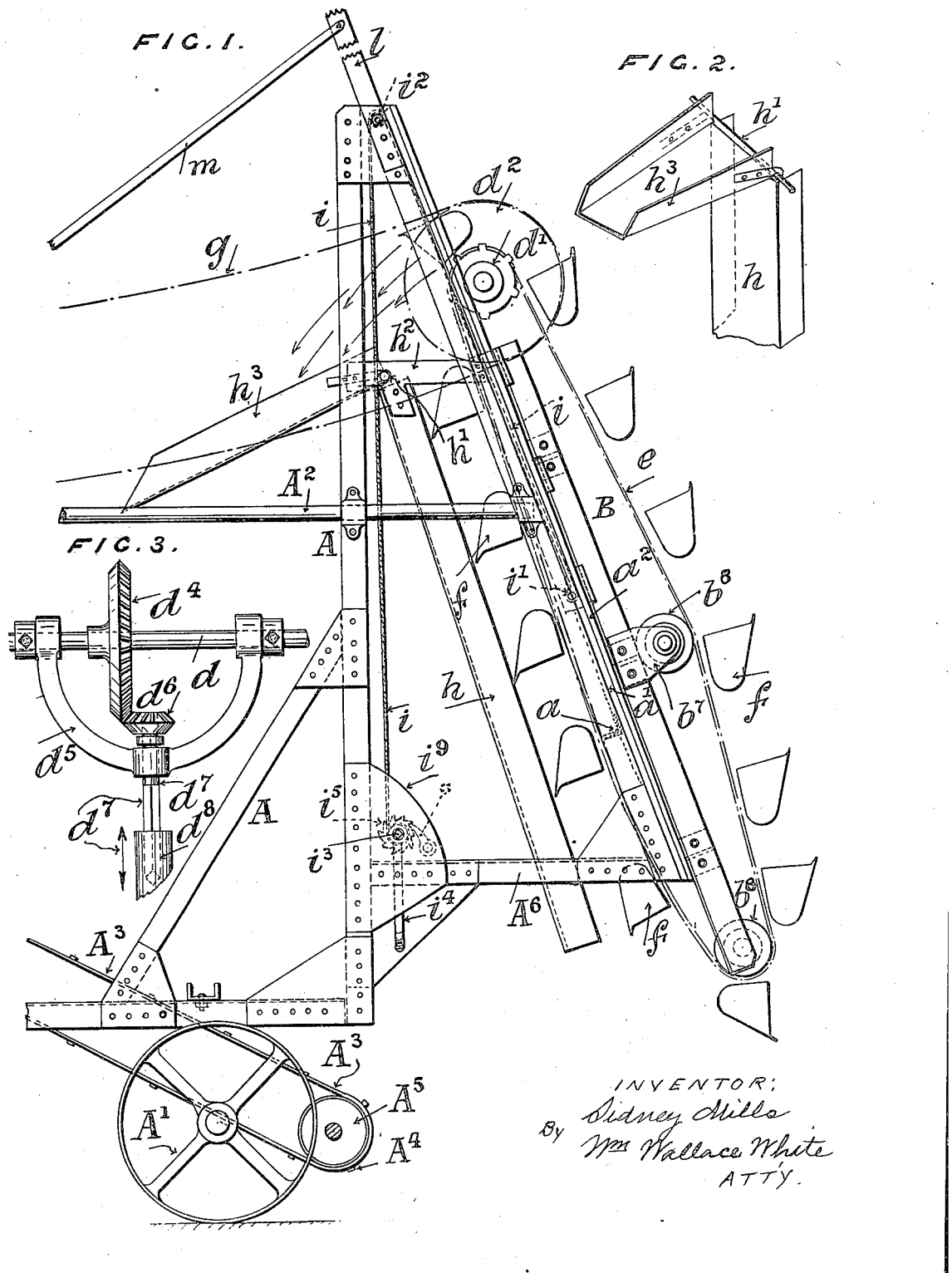

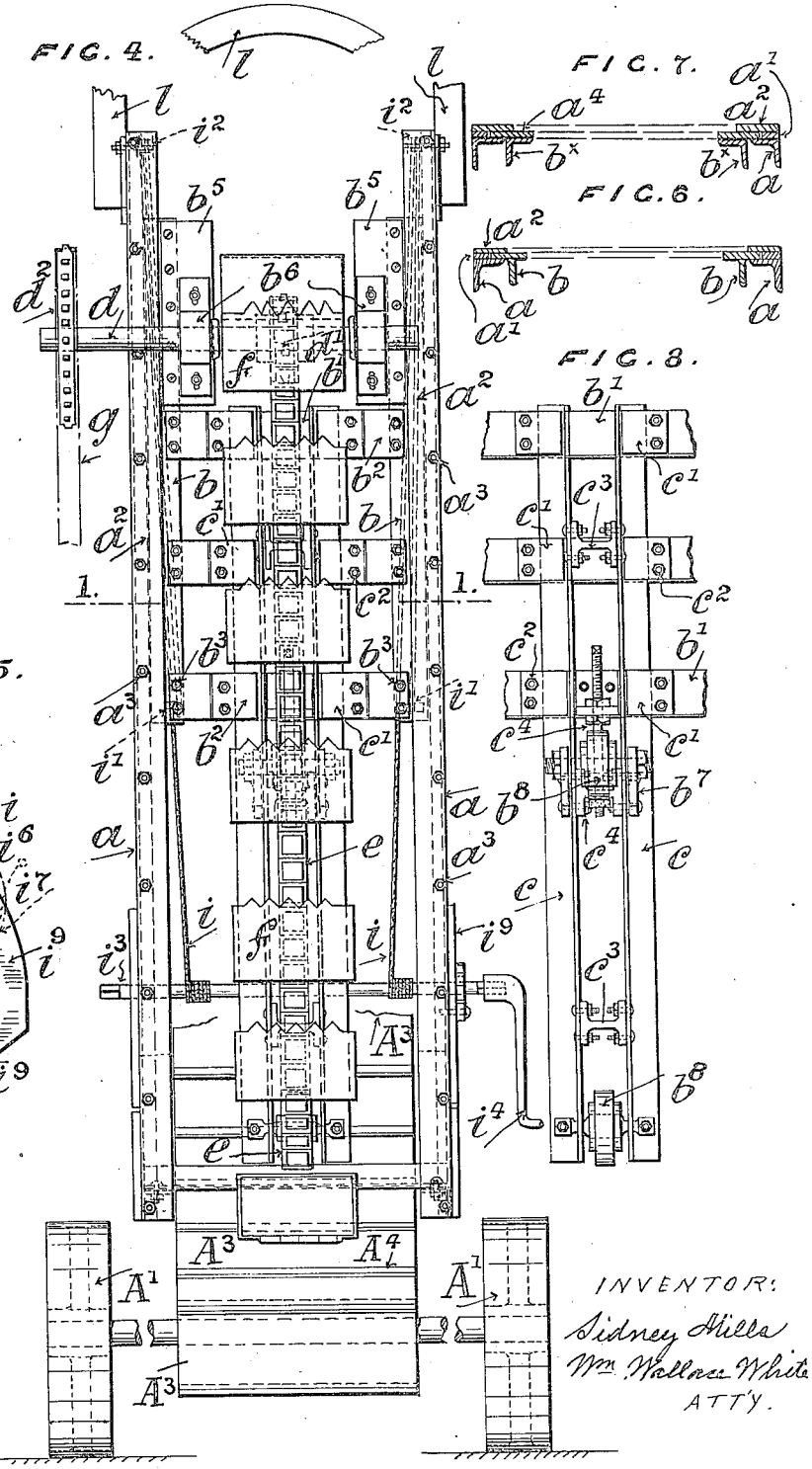

1,445,406

UNITED STATES PATENT OFFICE.

SIDNEY MILLS, OF MANCHESTER, ENGLAND, ASSIGNOR OF ONE-HALF TO ALFRED JOHNSON, OF MANCHESTER, ENGLAND.

PORTABLE ELEVATOR.

Application filed February 19, 1920. Serial No. 359,844.

*To all whom it may concern:*

Be it known that I, SIDNEY MILLS, a subject of the King of Great Britain and Ireland, residing at 14 Grasmere Street, Longsight, Manchester, in the county of Lancaster, England, have invented new and useful Improvements in or Connected with Portable Elevators, of which the following is a specification.

This invention relates to improvements in or connected with portable elevating and conveying or unloading apparatus such as are suitable for lifting or dealing with slack coal, sand, gravel, china clay, and such like, contained in barges, wagons, etc., or which requires to be lifted or elevated from a position in some cases from below a roadway, platform, wharf, siding or elsewhere.

In such apparatus it is known to use an endless chain of buckets which in travelling around, pick-up and lift the material and discharge same onto a travelling belt or into a receptacle, and, the novelty of this invention consists in supporting the endless chain of buckets upon an adjustable or slidable, boom or on an adjustable or slidable support whereby the chain of buckets can be lowered or raised as required so as to operate below or above the level at which the belt or receiver is disposed. In connection with such adjustable boom, hand operated means are provided which can be actuated to lower or raise the adjustable or slidable boom the latter being provided with guiding means which engage suitable fixed slides or supports. Thus, the position of the endless chain of buckets with respect to the material to be dealt with can be regulated.

The attached drawings illustrate a suitable form of the invention as applied to a portable conveyor fitted with an endless conveying belt which transports the material to the desired point.

In the said drawings:—

Fig. 1 is an end elevation showing the adjustable or slidable boom carrying the endless chain of buckets and other features, the portable conveyor structure being broken in length.

Fig. 2 is a broken perspective view of the chutes which are movable with the adjustable boom.

Fig. 3 shows in detail a modified driving arrangement for the shaft which actuates the chain of buckets or scoops.

Fig. 4 shows a front elevation of the adjustable boom, the frame-work supports, and other features.

Fig. 5 is a detail variation of the raising and lowering gear for the adjustable boom.

Fig. 6 shows a section of the adjustable boom slide and the guiding parts taken on the line 1—1 Fig. 4.

Fig. 7 is a modification of the construction shown in Fig. 6.

Fig. 8 shows a separate view of the frame-work which helps to support the endless chain of buckets and forms part of the adjustable boom.

Use is made of a portable type of elevator of suitable construction, and which is marked A. This can be built up from lengths of angle and channel sections or of frame and lattice work, and is mounted on road wheels $A'$ and provided with tubular stays $A^2$ by which the complete conveyor A can be readily moved about. A conveyor belt $A^3$ with lags $A^4$ passes over rollers $A^5$ in cases where it is desired to transport the material lifted and dropped by the endless chain of buckets to the rear or to carry the material into wagons or receptacles, or to dump same in a suitable spot.

The front frame-work of the elevator A is strongly designed in triangular or other fashion as shown, and the bottom stay $A^6$ is arranged sufficiently above the ground level as will allow the slidable boom when the elevator is wheeled forward to pass over any coping or obstruction of ordinary height.

The elevator structure to support the adjustable boom has stays or fixed lower guides, these being shown in the drawings (see Fig. 6) as of angle-iron and marked $a$. They are rigidly fixed or framed-up and disposed at an angle to the vertical so as to form the lower half slides or guides for the adjustable boom B which carries the chain of buckets. Resting on the angle-iron lengths $a$ are narrow flat metal lengths $a'$ which are spacing pieces, and over such narrow flat metal lengths are wider plates $a^2$ the three lengths $a$, $a'$, and $a^2$ being secured together by bolts $a^3$. Three such elements on either side produce a proper slide or guide for the adjustable boom. This latter consists of shorter lengths of metal $b$ of T section or of structures having projecting ledges to engage the slides before mentioned. Fig. 7 shows a variation wherein plates $a^4$ are secured to angle-iron lengths $b^x$ and take the place of lengths of T section.

The two lengths of metal of T section $b$, constitute the adjustable boom and are braced or connected together by cross-plates $b'$ a rigid connection being made by applying short stiffening plates $b^2$ and bolts $b^3$ which pass through all three elements on each side. To the cross-plates $b'$ we fix two lengths of angle-iron $c$ these being held by small clamping plates $c'$ fixed by bolts $c^2$. The two lengths of angle-iron $c$, $c$ are spaced apart and stiffened or braced by brackets $c^3$, $c^4$. To the T lengths $b$ are fixed plates $b^5$ which support bearings $b^6$ for the shaft $d$ which carries the sprocket wheel $d^1$ and the chain wheel $d^2$. Thus the angle-iron lengths $c$, $c$ and the plates $b^5$, $b^5$ carry the wheels $b^8$, $b^8$, and $d'$ over which works the elevating chain $e$ to which are attached the elevating buckets. The wheels $b^8$ $b^8$ are plain metal wheels turning on axles as shown and the brackets $b^7$ supporting the centre wheel are made adjustable so as to affect the chain $e$. This chain $e$ can be of any appropriate type and carries the buckets $f$ and is driven by the sprocket wheel $d'$ on the shaft $d$ upon which the driven chain wheel $d^2$ is fixed, the latter, in Fig. 1, being shown as actuated by a chain $g$ from an electric motor (not shown) or other source of power. The chain $g$ is required to be sufficiently flexible in its length to compensate for any requisite movement of the adjustable boom and a jockey gear wheel or loaded lever may act with the stretch of chain. In lieu of a chain drive, the arrangement indicated by Fig. 3 may be used wherein a bevel wheel $d^4$ is fixed on the shaft $d$ and also a swivelling hanger $d^5$, a small bevel $d^6$ attached to a shaft $d^7$ finding a bearing in such swivelling hanger $d^5$. A length of such shaft $d^7$ is irregular in cross-section and fits in and is slidable in a driven sleeve $d^8$ such sleeve being so shaped as to preserve a driving connection, the arrangement being a telescopic one. Any movement downwards of the shaft $d$ (following movement of the adjustable boom) withdraws said irregular shaft $d^7$ slightly outwards, in like manner elevation of the shaft $d$ pushing inwards the said irregular shaft. In this manner a proper driving connection can be preserved no matter what the position of the adjustable boom.

An over-flow chute $h$ is fitted in brackets attached to the adjustable boom and so moves with the latter, the drawings Figs. 1 and 2 showing an axle support $h^1$ which journals in brackets $h^2$.

To the adjustable or slidable boom B are attached flexible ties such as wire ropes $i$ fixed at the points $i'$, $i'$, and which wire ropes $i$ are led over runners $i^2$, $i^2$ to the shaft $i^3$ supported in brackets $i^9$ in the conveyor carriage. A removable lever handle $i^4$ can be applied to the squared end of the shaft $i^3$ by which such shaft can be turned to raise or lower the adjustable or slidable boom. A ratchet and pawl mechanism $i^5$ is provided which serves to hold the adjustable or sliding boom in any elevated position. By releasing the pawl, the adjustable or sliding boom B can be lowered to any extent within the range provided. Instead of connecting the wire rope $i$ to the winding shaft $i^3$ said rope $i$ may be connected to a drum on the shaft $i^6$, this shaft $i^6$ having a large pinion $i^7$ which is actuated by a small pinion $i^8$ fixed on the winding shaft $i^3$. The winding handle $i^4$ is applied to the shaft $i^3$ and ratchet mechanism $i^5$ is used. This modification is clearly indicated by the detail Fig. 5.

By actuating the winding shaft $i^3$ in one direction or the other, the flexible wires $i$, $i$ are wound or unwound and so raise or lower the adjustable boom in its fixed guiding slides. As an example, in the unloading of a barge, the adjustable or sliding boom B can be lowered as required as the contents of the barge are removed, the means indicated providing for the setting of the endless chain of buckets to the material as required. In like manner the adjustable or slidable boom can be set for the buckets to work at a level higher than the road level on which the wheels A' rest, and, as inroads are made, the complete conveyor can be moved in as the work is performed. It is clear that the power to fully elevate the adjustable or sliding boom affords facilities for moving the complete elevator from one position to another.

A chute or guide such as $h^3$ is fitted for the buckets to tip into and such chute directs the material lifted onto the conveyor belt $A^3$, or onto the floor, or into receptacles, or otherwise.

The mechanism set forth allows of the automatic transferring of loose or small material from barges, railway trucks, or hoppers, because the buckets on the chain supported by the adjustable or slidable boom can reach down according to adjustment below the ground, platform, or working level; or be otherwise set. With the improved elevator above described shovelling is reduced to a minimum.

By the use of an adjustable or slidable boom capable of being set by provided mechanism it is possible to remove material in easy fashion starting at the top and working down to the bottom as the portable endless bucket elevator can be moved or set to its work by hand as required and readily combined with almost any belt or other conveying system which is capable of handling the material tipped by the traveling buckets.

It is clear the manner of supporting and guiding an adjustable boom may be varied as also the means for effecting its movement or adjustment; for example, the latter may be done by lever and link mechanism or by gearing, the provision of an adjustable boom being the important feature.

The part marked $l$ is a yoke for staying the built-up uprights supporting the adjustable boom. Stays such as $m$ are used to brace up the yoke $l$ and are connected to the yoke and to the frame-work of the portable elevator $A$.

I declare that what I claim is:

1. A portable conveyor comprising a frame, wheels therefor, fixed guides carried by said frame, slideways in the fixed guides, a frame forming a slidable boom engaging said guides, and disposed at an angle to the vertical, chain wheels on the boom, an endless chain engaging said wheels, a plurality of buckets on the chain, means for raising and lowering the slidable boom, consisting of a flexible connection, means for retaining said boom at any position of adjustment consisting of a ratchet wheel and pawl, and driving mechanism for actuating the chain carrying the buckets.

2. A portable conveyor, consisting of a built-up structure, wheels for such structure, a vertical frame carried by the structure, an inclined frame forward thereof, angle-iron slideways carried by the frame, a slidable boom, extensions from the boom engaging the slideways, sprocket wheels on the slidable boom, a guide wheel on the boom, an endless chain engaging the sprocket wheels, a plurality of buckets on the chain, means for driving the upper sprocket wheel, a chute carried by said boom and slidable therewith, a flexible connection from the slidable boom, a hand wheel and a ratchet wheel and pawl for holding the slidable boom in any adjusted position as set forth.

3. A portable conveying apparatus, comprising a wheeled frame, an inclined frame carried thereby and having slideways formed thereon, a slidable boom having angle plates in engagement with said slideways, transverse supporting members secured to said boom, wheels mounted thereon, a power driven sprocket wheel carried by the boom, an endless chain engaging said wheels and sprocket wheel and carrying a plurality of buckets, a hand operated gear for adjusting said boom on its slideways, a flexible connection between said gear and boom, ratchet mechanism for retaining said boom in adjusted position, and chutes carried by said boom and slidable therewith.

In testimony whereof I have signed my name to this specification.

SIDNEY MILLS.